(No Model.) 3 Sheets—Sheet 1.

J. P. FARRELL.
COMBINED BEDSTEAD AND TABLE.

No. 355,760. Patented Jan. 11, 1887.

WITNESSES:
Christian Weber
Alfred Weber

INVENTOR
James P. Farrell
BY
Benj. A. Dare
ATTORNEY

N. PETERS, Photo-Lithographer, Washington, D. C.

(No Model.) 3 Sheets—Sheet 2.
J. P. FARRELL.
COMBINED BEDSTEAD AND TABLE.
No. 355,760. Patented Jan. 11, 1887.
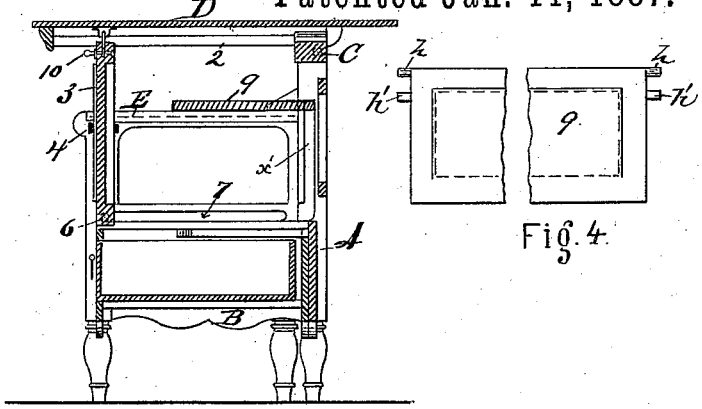
Fig. 3.
Fig. 4.
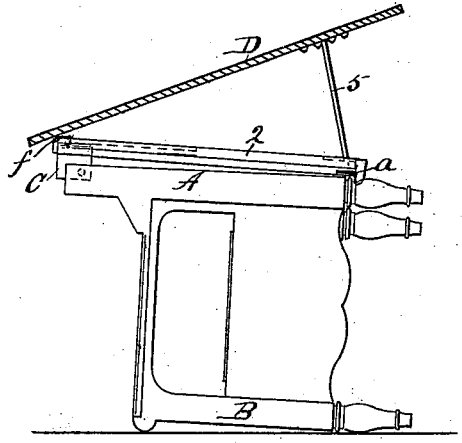
Fig. 5.
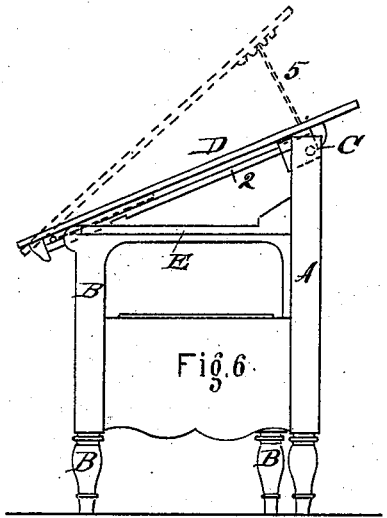
Fig. 6.
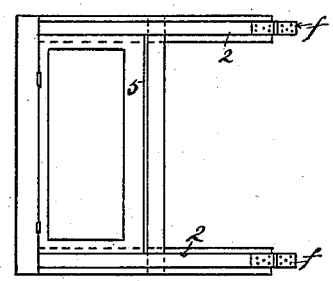
Fig. 8.
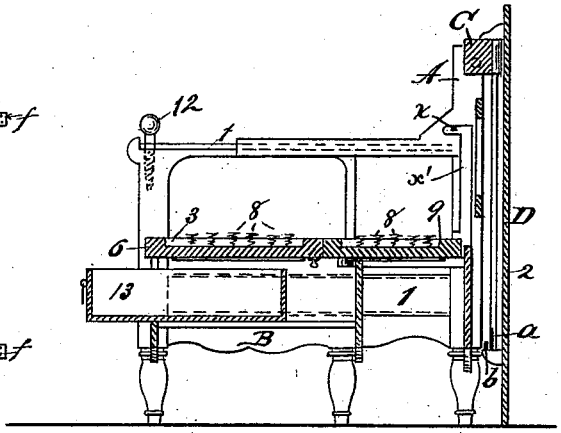
Fig. 7.
WITNESSES:
Christian Weber
Alfred Weber
INVENTOR
James P. Farrell
BY
Benj. A. Dare
ATTORNEY (No Model.) 3 Sheets—Sheet 3.

J. P. FARRELL.
COMBINED BEDSTEAD AND TABLE.

No. 355,760. Patented Jan. 11, 1887.

WITNESSES:
Christian Weber
Albert D. Read

INVENTOR
James P. Farrell.
BY Benj. A. Dare
ATTORNEYS

N. PETERS, Photo-Lithographer, Washington, D. C.

United States Patent Office.

JAMES P. FARRELL, OF NEW YORK, N. Y.

COMBINED BEDSTEAD AND TABLE.

SPECIFICATION forming part of Letters Patent No. 355,760, dated January 11, 1887.

Application filed January 28, 1886. Serial No. 190,115. (No model.)

*To all whom it may concern:*

Be it known that I, JAMES P. FARRELL, a citizen of the United States, and a resident of New York, in the county of New York and State of New York, have invented certain new and useful Improvements in a Combined Bedstead and Table, of which the following is a specification.

My invention relates to that class of furniture that may be changed when desired to fill their respective duties.

My object is to so construct a bedstead that it may be used as a table or settee, if desired, and so combined as to make a neat and useful article of furniture, which will be hereinafter more fully explained, reference being had to the accompanying drawings, in which—

Figure 1:
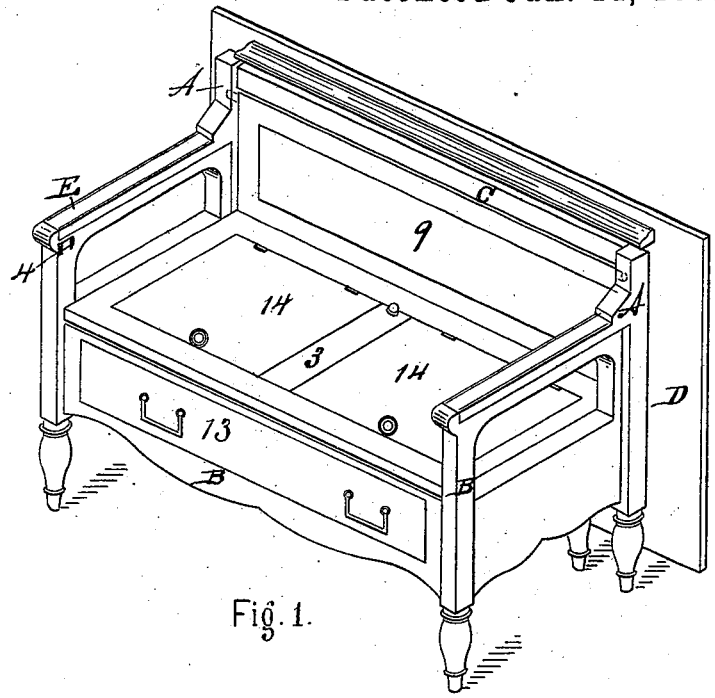
Figure 2:
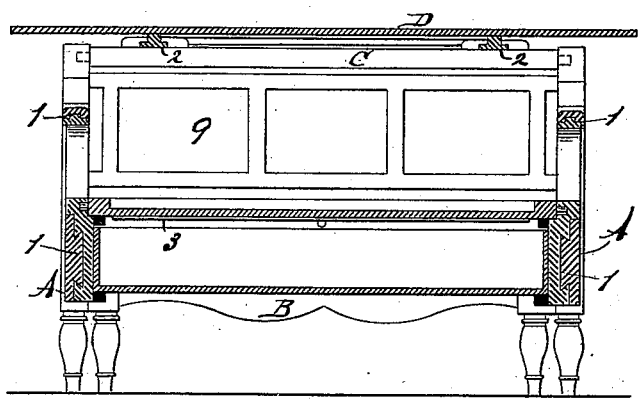
Figure 9:
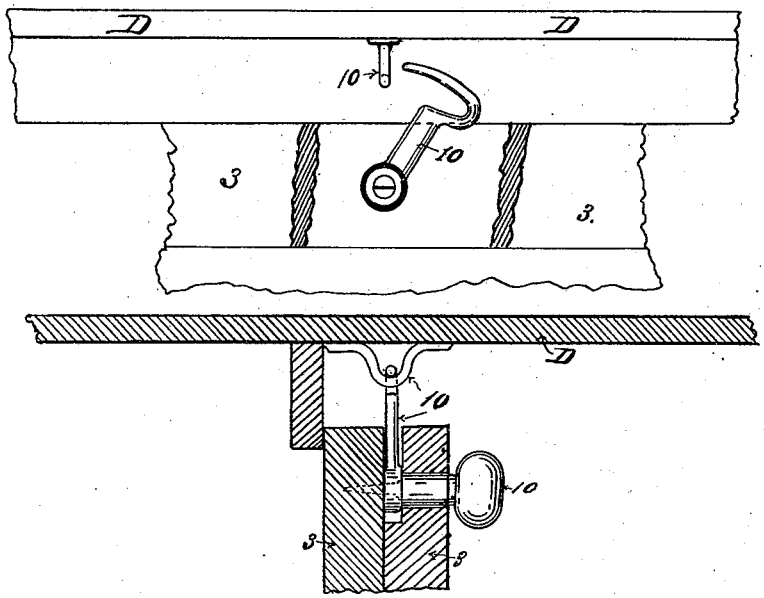
Figure 10:
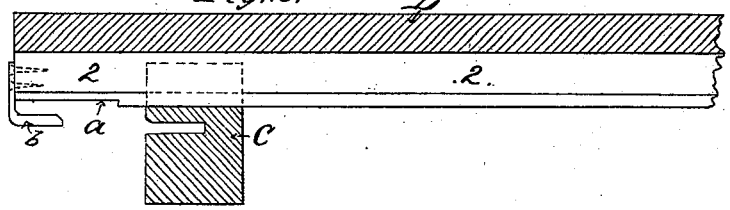
Figure 11:
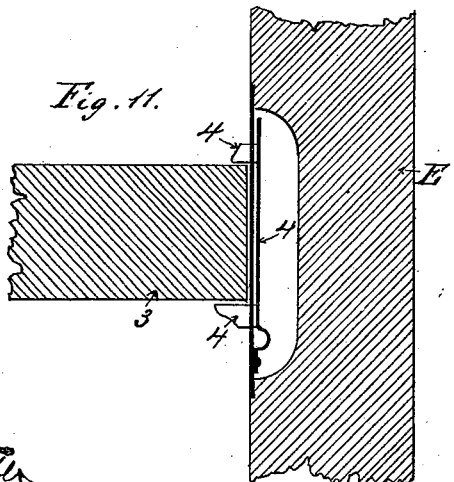

Figure 1 represents a perspective view of a bedstead and table when folded up as a settee. Fig. 2 represents a front elevation in section; Fig. 3, an end view in section; Fig. 4, back of settee when detached. Figs. 5 and 6 show different views when used as a table. Fig. 7 represents an end view in section when extended as a bedstead. Fig. 8 represents angle-rest frame detached. Figs. 9, 10, and 11 represent detail parts enlarged and in section.

A represents the main frame, to which the movable seat-frame B is attached by dovetail grooves or slides 1, and to the upper part of said frame A the revolving bar C is secured, in which the guides 2, on the under side of the top D, move freely by passing through corresponding grooves in bars C, and enabling the top D to be raised easily and adjusted to any angle desired, as shown in the different views. The guides 2 are provided with detent or notch *a* and stop *b*, as shown in Fig. 7, to prevent top D sliding back when in a horizontal position, as shown in Figs. 2 and 3.

When closed, to be used as a settee or bedstead, the top D is placed in a vertical position down the back of frame A. When desired to be used as a flat-top table, the top D is drawn over and one edge supported on the upturned hinged seat 3, the said seat 3 being held in a vertical position by the spring-catch 4, secured to the inside of the arm E, and the seat is secured to the under side of the top D by a catch-hook, 10.

When an incline table is desired, the seat 3 is turned down and the top D allowed to rest on the arm E, as shown in Fig. 6, the said arm being provided with an extension-knob, 12, which allows any angle to the top D to be obtained by raising or lowering said knob 12.

If a lower table is required, the frame A may be turned over on its front, as shown in Fig. 5, which will bring the top D into a horizontal position, the height being the width of the frame A, and may be raised to any angle desired, and held there by the retaining-stop frame 5, resting in the notches *e*, the said frame 5 being hinged to the guides 2. The said guides 2 are also hinged to the under side of the top D at *f*, which also enables the incline table-top shown in Fig. 6 to be elevated to the angle shown in same figure by dotted lines.

When the device is used as an inclined table for displaying textiles, the back 9 is raised into a vertical position to form a shelf, as shown in Fig. 3, for laying samples or other articles upon. The back 9, being in a vertical position, is raised upward, the dowels *h* and *h'* traveling in the vertical slot *x'* until the dowel *h'* enters the horizontal slot *x*, when it is drawn forward until the dowel *h* rests against the top of the slot *x'*, the top of the said slot *x'* being in line with the slot *x*.

To use the article for a bedstead, the top D is placed in a vertical position back of the frame A, and the frame B is drawn out, as shown in Fig. 7. The seat 3 is then turned upside down on the pivots 6, the same traveling along in the groove 7, which brings the springs 8 on the top. The back 9 is then lowered to fill up the space left by drawing out the frame B. The said back 9 is also provided with springs 8 upon its reverse side, which will be on the upper side when lowered. When thus arranged, it is ready for the mattress or bedding.

Under the seat 3 and in the frame B is placed a drawer, 13, in which the bedding may be stored when not in use. The same may be removed from the drawer by raising the small part of the seat 14. The said drawer may be used as a receptacle for a commode, if desired, when the article is constructed in the form of a settee. Thus it will be seen I am by this combination enabled to construct a neat and useful article of furniture and adaptable to various uses.

I am aware of table-bedsteads being used as shown by Letters Patent granted to W. B. Jones, May 4, 1869, No. 89,776; but I disclaim any part of the construction described therein.

I do not claim under this application for Letters Patent anything that I have claimed in my former patent granted to Farrell, May 25, 1886, No. 342,343, (folding tables.)

What I claim, and desire to secure by Letters Patent, is—

1. In a combined bedstead and table, the frame A, having the upright posts and arms E, and provided with a movable back, 9, in combination with the frame B, constructed to close within the frame A when not extended, the said frame B having the reversible hinged seat hinged thereto, substantially as and for the purpose specified.

2. In a combined bedstead and table, the revolving top D, having guides 2 on its under side, in combination with the bar C, pivoted to the upper ends of the upright posts, and provided with transverse grooves to receive said guides, which are provided with the detents $a$ and stop $b$, substantially as and for the purpose specified.

3. In a combined bedstead and table, the frame A, having the upright posts, in combination with the bar C, pivoted to the upper end of said posts, and provided with transverse slots, the top D, having guides on its under side, hinged at one end to the said top and working in the slots on the bar C, and supporting-rods 5, hinged to the guides 2, substantially as and for the purpose specified.

Signed at New York, in the county of New York and State of New York, this 18th day of January, A. D. 1886.

JAMES P. FARRELL.

Witnesses:
JOHN FITZGERALD,
BENJN. A. DARE.